United States Patent [19]

Myers

[11] 4,092,486
[45] May 30, 1978

[54] SERVICE POLES

[75] Inventor: John L. Myers, Parkersburg, W. Va.

[73] Assignee: Textron Inc., Providence, R.I.

[21] Appl. No.: 722,731

[22] Filed: Sep. 13, 1976

[51] Int. Cl.² .................................................. H02G 3/04
[52] U.S. Cl. .................................................. 174/48
[58] Field of Search ...................... 174/48, 49; 52/220, 52/221, 40

[56] References Cited

U.S. PATENT DOCUMENTS

| 3,609,211 | 9/1971 | Van Herk | 52/221 X |
| 3,889,044 | 6/1975 | Flachbarth et al. | 174/48 |
| 3,909,502 | 9/1975 | Lacan | 174/48 |

Primary Examiner—J. V. Truhe
Assistant Examiner—D. A. Tone
Attorney, Agent, or Firm—Frederick J. Olsson

[57] ABSTRACT

A power/telephone service pole having power and telephone channels oriented back-to-back with their bases joined together and whose covers can be snaped on and off while the pole is installed; a foot-type pedestal is connected to the bases for adjustably spacing the bottom end of the pole above the floor or alternatively a socket-type pedestal mounts the bottom end of the pole down close to the floor; a pre-wired power receptacle assembly occupies the power channel with its receptacles being held by a retainer which in turn is retained by the cover; a junction box with an easy access, downwardly facing cover is disposed at the top of the power channel.

6 Claims, 9 Drawing Figures

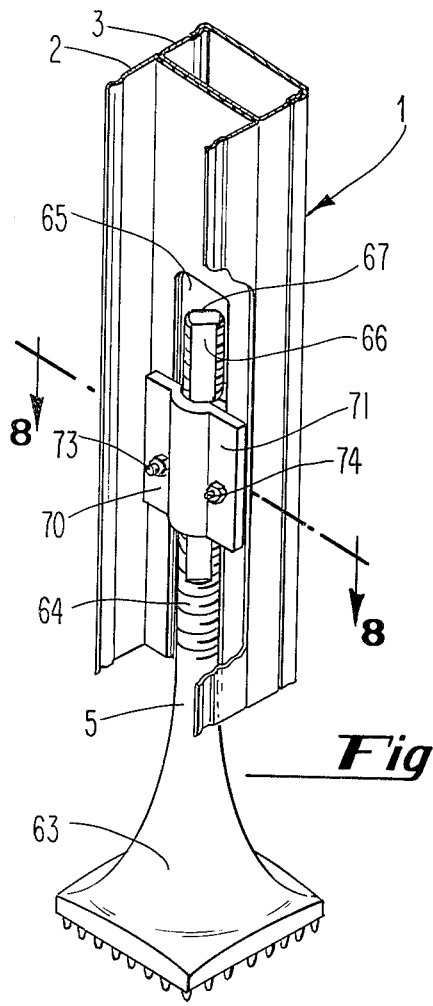
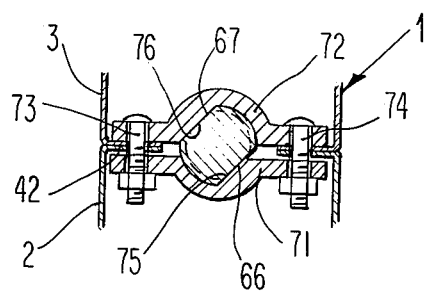
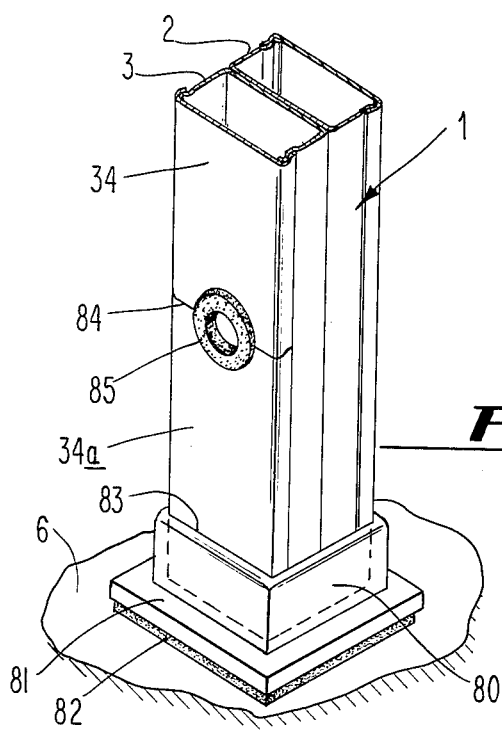
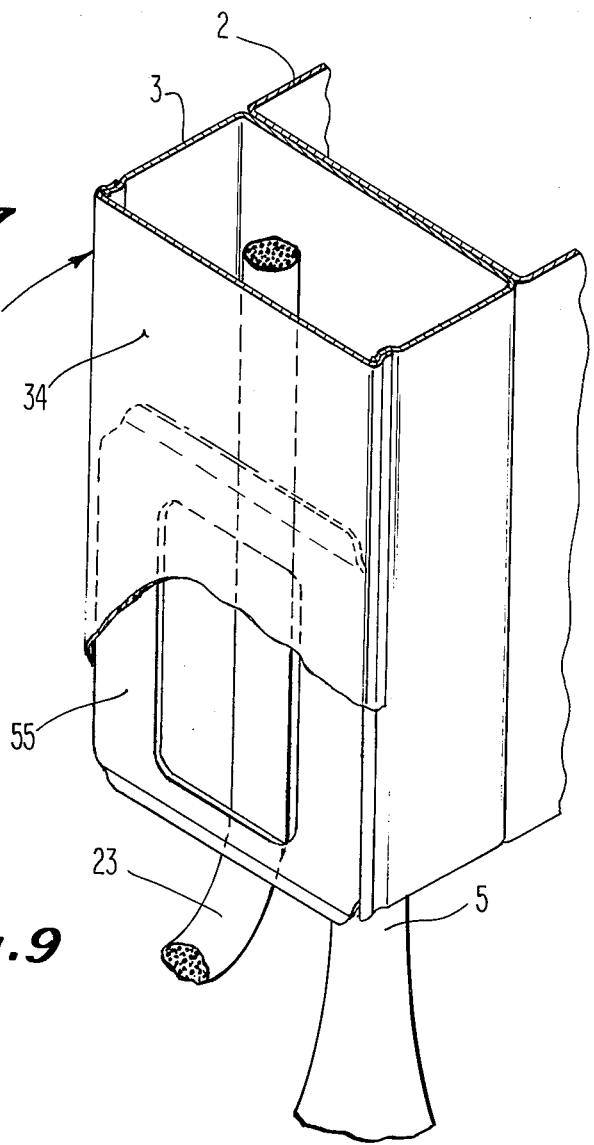
Fig. 7
Fig. 8
Fig. 9
Fig. 6

SERVICE POLES

This invention relates to electrical and communication distribution systems for buildings or the like and in particular relates to improvements in poles which provide power and/or telephone service in the rooms of buildings.

More specifically the invention relates to certain improvements in the service poles shown in U.S. Pat. Nos. 3,889,044 and 4,015,397 both assigned to the assignee of this invention.

One of the objects of the invention is to provide in a service pole, a simplified housing structure made up of two rolled channels which are riveted back-to-back to form a rigid, unitary member with two mechanically isolated channels or conduits, one for carrying power and the other for carrying telephone conductors and each conduit having a cover which can be snapped on and off independently of each other.

Another object of the invention is to provide in a service pole, a simplified power outlet system which includes a pre-wired power receptacle assembly comprising receptacles and conductors which are simply placed in the power channel and held in position by receptacle retainers which are secured by the action of the walls of the channel and the channel cover.

Another object of the invention is to provide in a service pole, an improved pedestal structure for supporting the pole above the floor at some desired adjusted position and which is located with respect to the telephone channel cover so that the same can be removed and replaced without interference.

Another object of the invention is to provide in a service pole, an improved pedestal for supportng the pole in a fixed position down close to the floor and which cooperates with a short section of the telephone channel cover so as to provide for the remaining section of the telephone cover to be easily pried off and replaced.

Another object of the invention is to provide in a service pole, an improved power feed junction box mounted directly over the power channel and downwardly oriented to be conveniently accessible to the electrican for connecting the power conductors to the power lines and whose removable cover is coordinated with the power channel cover so that either cover can be independently removed and replaced.

The details of the invention will be explained below in connection with the drawings;

FIG. 6 is a fragmentary perspective view of the bottom of the pole of FIG. 1 and illustrating how the telephone cover is locked;

FIG. 7 is a fragmentary perspective view of the bottom of the pole of FIG. 1 showing a pedestal which mounts the end of the pole housing in a position above the floor;

FIG. 8 is a view taken along the lines 8—8 of FIG. 7; and

FIG. 9 is a fragmentary perspective view of the bottom of the pole of FIG. 1 and illustrating a pedestal which mounts the end of the pole housing closely adjacent the floor.

Figure 1:
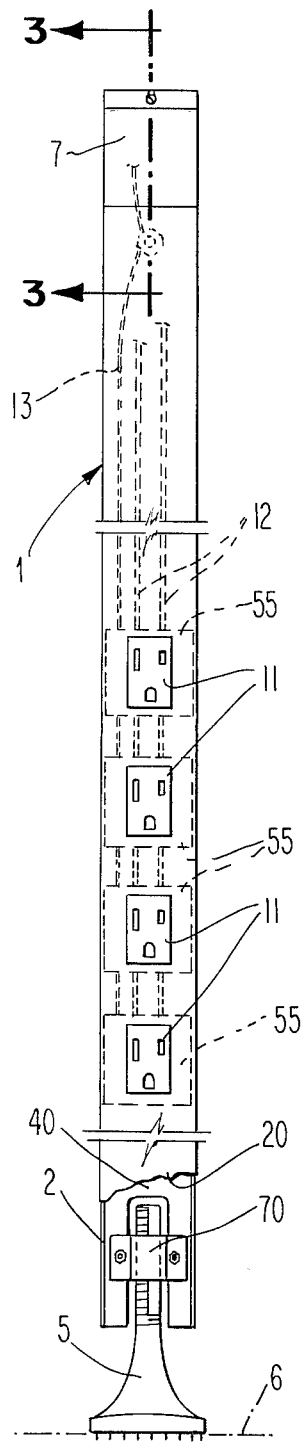
FIG. 1 is a front elevational view of a service pole constructed in accordance with the invention.
Figure 2:
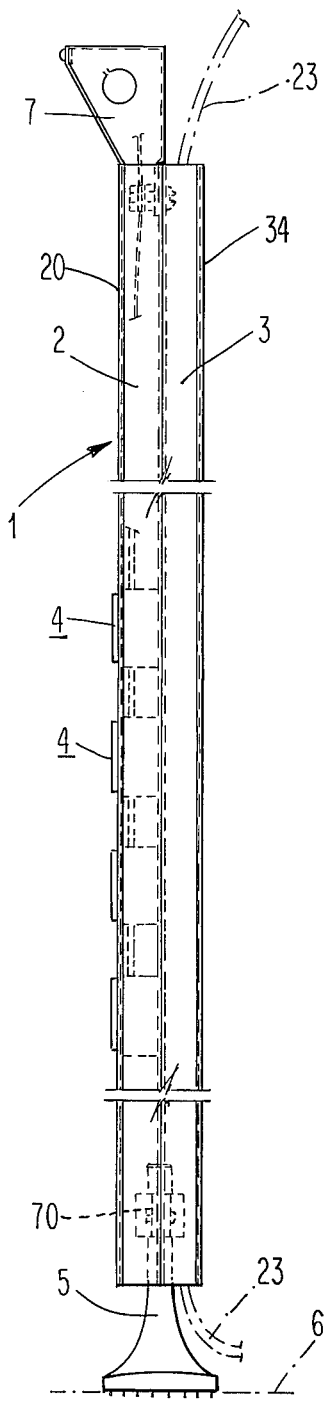
FIG. 2 is a side elevational view of the pole of FIG. 1.

With reference to FIGS. 1 and 2, the major components of the pole are: a housing 1 having a power channel 2, a telephone channel 3, a power receptacle assembly 4 in the power channel, a pedestal 5 mounting the housing on the floor 6 and a junction box 7 on top of the power channel. The T-bar hanger for connecting the pole to the ceiling is not shown. This is described in the above mentioned patents.

Figure 4:
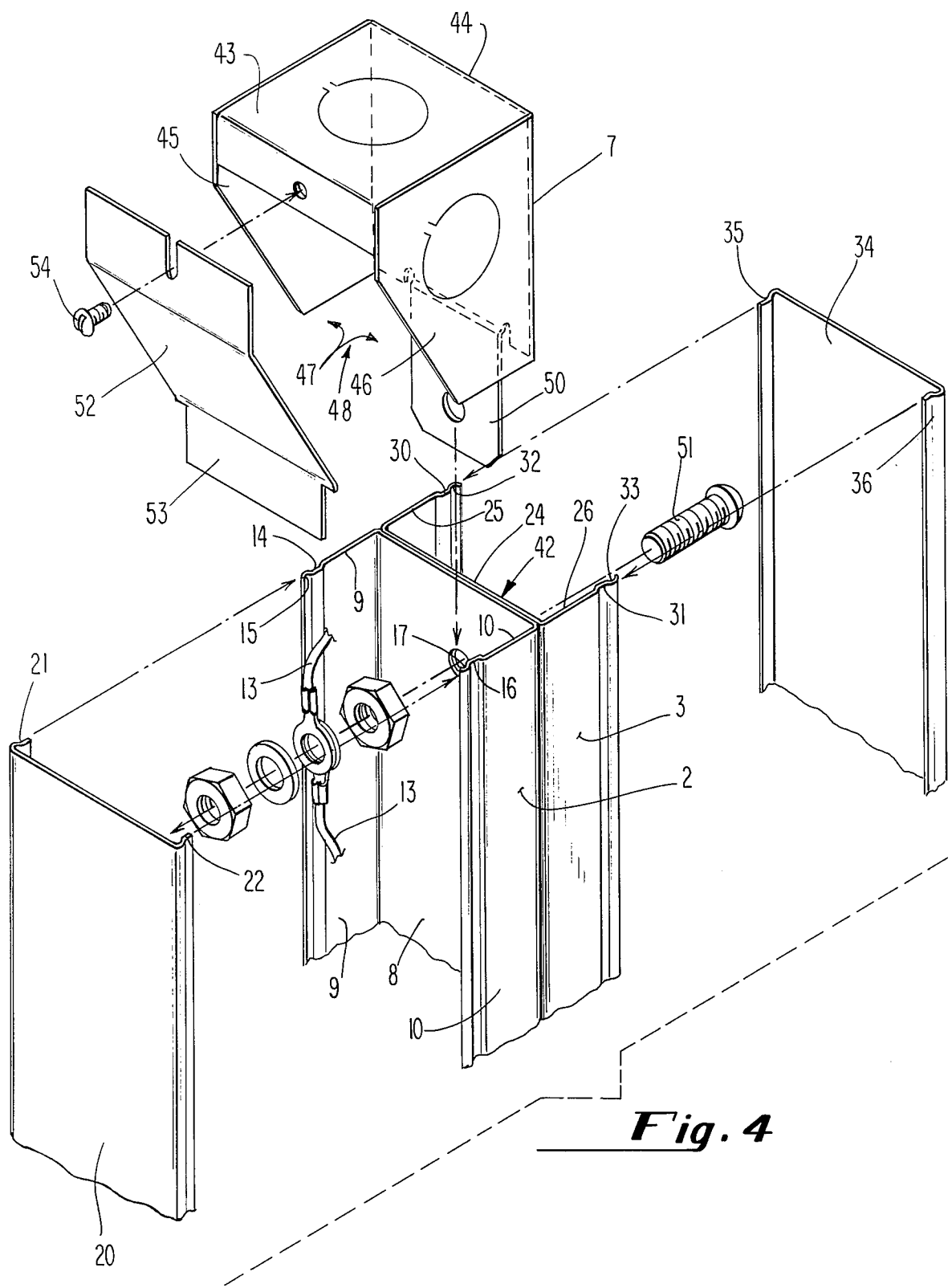
FIG. 4 is an exploded perspective view of the top of the pole of FIG. 1 and particularly showing the housing and junction box structure.
Figure 5:
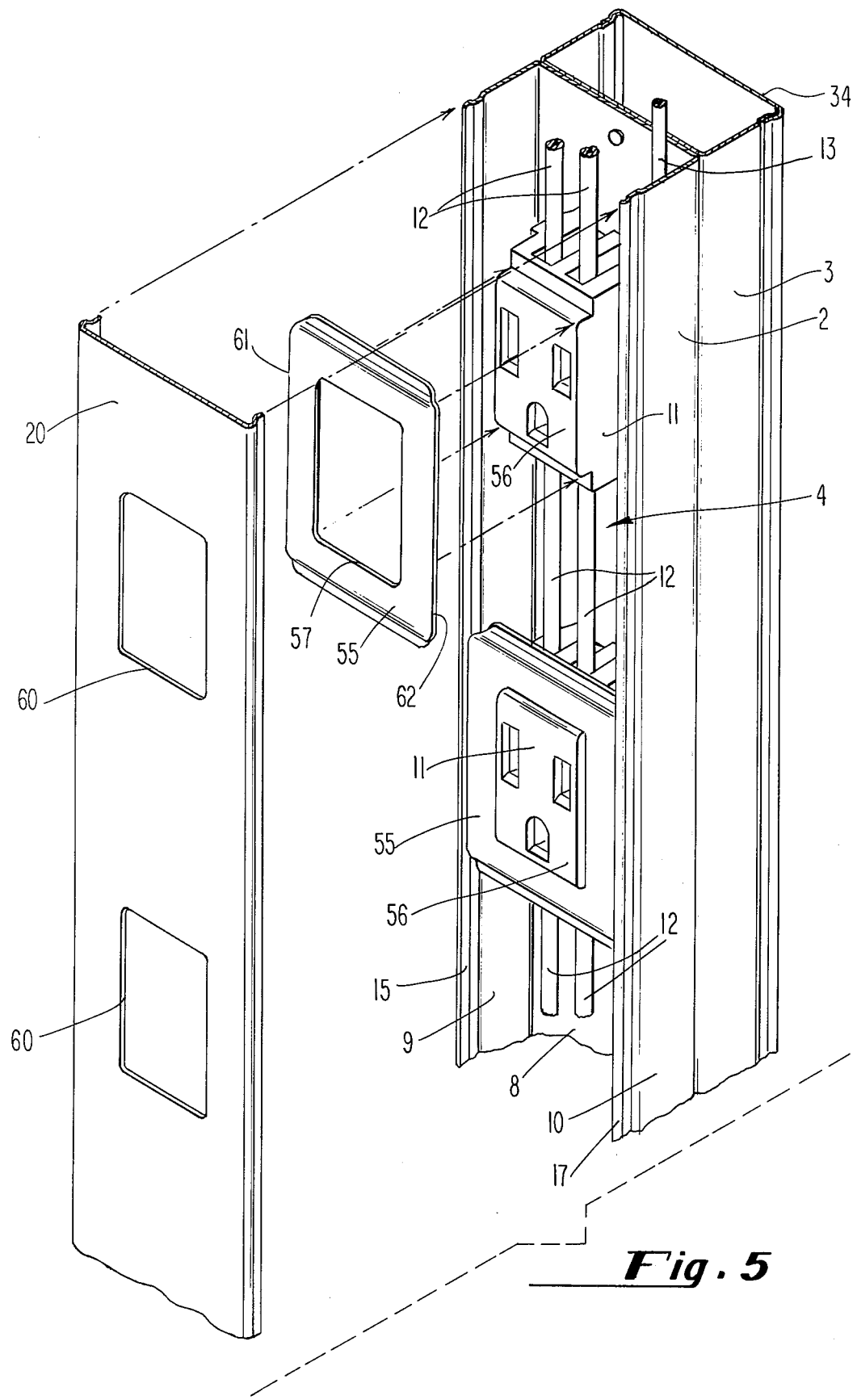
FIG. 5 is an exploded perspective view of a section of the pole particularly showing the power receptacle assembly.

With reference to FIGS. 4 and 5 the C-shaped channel 2 has the base 8 and a pair of sides 9 and 10. This channel carries the power receptacle assembly 4 including the receptacles 11 the power conductors 12 and ground wire 13.

The top of side 9 is off-set to form exterior groove 14 and interior groove 15 which are co-extensive with the side. Likewise the side 10 is off-set to form the exterior groove 16 and interior groove 17.

A cover 20 has flanges 21 and 22 which are contoured to fit in the exterior grooves 14 and 16.

The cover is mounted on the sides by placing one flange in an exterior groove and snapping the other flange into the other exterior groove. The distance between the exterior grooves 14 and 16 is slightly greater than the distance between the flanges 21 and 22 so that when the cover 20 is installed the sides 9 and 10 are slightly drawn together. The cover is removed by prying away one flange with a tool such as a screw driver.

Normally, the cover 20 on the power channel 2 is not removed however it will be evident that when the cover is removed, the open space between the sides 9 and 10 provides ready access to the interior of power channel.

Figure 3:
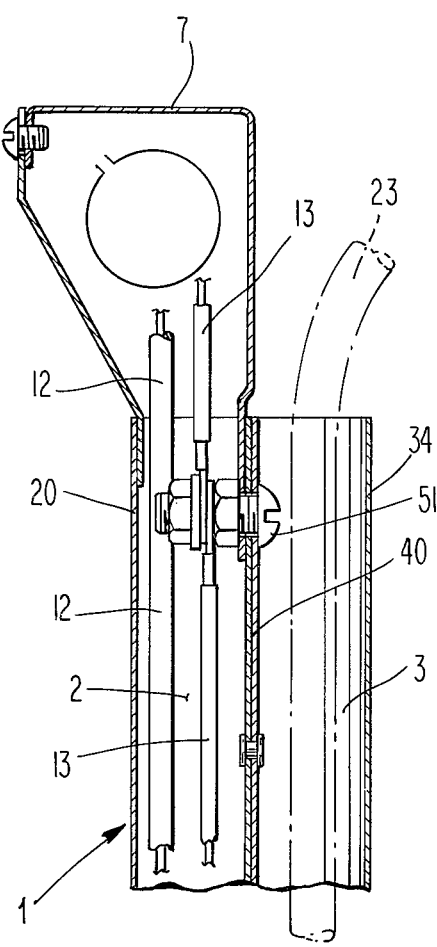
FIG. 3 is an enlarged fragmentary sectional view taken along the lines 3—3 of FIG. 1.

The C-shaped channel 3 is adapted to carry telephone cable 23 (FIGS. 2 and 3). Referring to FIG. 4, the channel has a base 24, a pair of sides 25 and 26 with exterior grooves 30 and 31 and interior grooves 32 and 33. The cover 34 has contoured flanges 35 and 36 adapted to engage with the exterior grooves 30 and 31. The cover 34 is installed and removed the same as the cover 20.

The base 8 of the channel 2 and the base 24 of the channel 3 are butted against each other and riveted. The two bases form a main support 42.

As best noted in FIG. 2, the telephone cable 23 is adapted to extend from the top of the pole thru the telephone channel 3 and out the bottom end to an amphenol connector (not shown) and thence to a telephone. The power conductors 12, connected to the receptacles 11, extend from the lowest receptacle upwardly thru channel 2 to the junction box 7. It will be readily seen that the telephone cable 23 and the power conductors 12 are mechanically isolated by the main support 42.

The channels 2 and 3 are identical in size and are roll formed. This is highly advantageous from the standpoint of savings in tooling, fabrication, and inventory. Moreover, riveting the channels back-to-back makes for a unitary, rugged structure with positive isolation of the power and telephone conductors.

The junction box 7 will be described particularly in connection with the FIG. 4.

The box has a closed top 43, a closed rear side 44 and a pair of closed edge sides 45 and 46 and open front 47 and an open bottom 48. The open bottom is in communication with the power channel 2 for receiving the power conductors 12 and ground wire 13.

position rear side has a tab 50 which is adapted to engage the main support 42 and be locked in positon by the nut-bolt assembly 51. The open front 47 is spanned by the cover 52 which has a tab extending down behind the cover 20 when the same is in place. The cover 52 is held in position as by the screw 54.

It will be apparent that when the cover 52 is in place it offers no interference to the removal and replacement of the power channel cover 20 and vice versa.

With reference to FIG. 2, it will be observed that the box has a substantial overhang brought about by the outward extension of the top 43 and sides 45 and 46. Also the sides 45, 46 and cover 52 are biased so that the opening 47 and cover 52 are oriented downwardly toward the floor. This overhang and orientation enhances the ability of the electrican to install and remove the cover, to install cable connectors on the junction box and properly position and join the conductors 12 to the building power lines.

The power receptacle assembly and the manner of securing it in the power channel 2 will be described next.

The conductors and receptacles are set in channel 2 and the receptacles captured by the cooperative action of retainers 55 and the cover 20. Each receptacle has a front raised section 56. Each retainer 55 has an opening 57. The cover 20 has openings 60. The openings 57 and 60 are dimensioned to receive the raised section 56. The edges 61 and 62 of the retainer are spaced apart slightly greater than the distance between the interior grooves 15 and 17. When the retainers are fitted between the interior grooves as shown in FIG. 5 the sides 9 and 10 are slightly spread. When in this position the raised section 56 extends thru the retainer opening 57. The retainer bears on the face of its receptacle. The rear face of the receptacle has spring means so that the pressure exerted by the retainer insures that the receptacle is firm against the main support.

When the cover 20 is installed the raised section 56 extends through opening 60. The cover tends to draw the sides 9 and 10 together. This increases the pressure of the interior grooves 15 and 17 against the retainer edges 61 and 62. Thus, the retainer is mechanically captured in the grooves.

It is pointed out that the width of the power channel may be such that the sides of the receptacle engage the sides of the channel. In such an instance it is not necessary to use retainers. The sides of the channel provide for lateral positioning and the opening in the cover insures the vertical position.

The power outlet arrangement provides for both individual receptacle grounding and pole grounding. With reference to FIG. 1 the ground wire 13 is connected to each of the receptacles 11 and at the top is connected by the nut-bolt arrangement 51 to the main support 42. The ground wire then goes up to the junction box for connection to the system ground.

The retainer 55 has an additional use as illustrated in FIG. 6. The retainer is set up at the bottom end of the telephone channel 3 and is locked in the interior grooves 32 and 33 by the cover 34. The telephone cable 23 extends down and outwardly from the bottom of the channel. If the telephone cable were yanked (say to the left in FIG. 6) it would engage the retainer. Since the retainer is physically captured it cannot move. Therefore the cover 34 can not be yanked off. Otherwise, it the retainer were not employed, a yank on the cable could pull off the cover 34.

The pedestals of the invention will next be described in connection with FIGS. 7, 8 and 9.

The pedestal 5 has a lower foot section 63 and an upper rod-like section 64. The section 64 extends into a slot 65 formed in the main support 42. The upper section 64 has a pair of flats 66 and 67.

A clamp 70 interconnects the pole and pedestal and provides for the pole to be adjusted to some desired position along the upper section 64 and then locked in place.

The clamp comprises the plates 71 and 72 which are disposed on opposite sides of the main support 42 and connected to the main support by nut and bolt assemblies 73 and 74. The plates have flats 75 and 76 corresponding to the flats 66 and 67 on the pedestal upper section 64. The nut and bolt assemblies 73 and 74 when tightened draw the flats firmly into engagement so as to hold the pole in the adjusted position on the pedestal.

In FIG. 9 I have shown an alternative form of pedestal which mounts the pole close to the floor.

This pedestal 80 comprises a base 81 having non-slip padding 82 which is adapted to engage the floor. On the top of the base is socket 83 which is dimensioned to receive the pole housing. The telephone cover 34 is split at 84 to form the lower section 34a. A split grommet 85 between the upper and lower sections forms an exit for the telephone cable. The split at 84 provides that the telephone cover can be pried off the pole without interference from the pedestal. The same kind of arrangement can be provided on the power side.

I claim:

1. A service pole for supplying power and/or telephone outlets in a room, the pole being adapted to extend between the floor and the ceiling of the room and the ceiling being the suspended type having means for supporting ceiling panels, the pole comprising:

a first elongated channel for carrying power conductors, the channel having a base and two sides and the top of each side being off-set to form an interior groove and an exterior groove;

a first cover extending across the open space formed by the sides of the first channel, the opposite sides of the cover having contoured flanges fitting into said exterior grooves whereby the cover is removably connected to the sides and said open space providing access to the interior of the channel when the cover is removed;

a second elongated channel for carrying telephone conductors the channel having a base and two sides, the top of each side being off-set to form an interior groove and an exterior groove and the base of the second channel being riveted to the base of the first channel whereby to form a main support and each said channel being rolled of sheet material;

a second cover extending across the open space formed by the sides of the second channel, the opposite sides of the second cover having contoured flanges fitting into the exterior grooves of the sides of the second channel whereby the cover is removably connected to the sides, the open space providing access to the interior of the second channel when the second cover is removed and said channels and covers forming a pole housing;

a junction box disposed at the top of said pole housing in communication with said first channel, the junction box having a portion substantially off-set from the pole housing and carrying a removable cover facing in a downward direction; and pedestal means disposed at the bottom of said pole housing for supporting the pole on a floor and said second cover and said pedestal means being constructed and arranged to permit the second cover to be removed and provide access to the second channel without interference from the pedestal means.

2. The service pole of claim 1 wherein said junction box comprises;

a body constructed as by a closed top, a closed rear side, a pair of closed edge sides, an open front side and an open bottom, the bottom being in communication with the interior of the first channel and the rear side being connected to said main support and the junction box cover being removably connected to said edge sides and closing off the open front side and the box cover having a lip extending underneath said first cover, the top and edge sides extending substantially outwardly of the pole housing to provide for said off-set portion and the edge sides being biased to provide for the downward orientation of said cover.

3. The pole of claim 1 wherein said main support has a vertically extending slot formed at the bottom thereof and said pedestal means comprises a foot having a lower section for engaging the floor and an upper section extending into said slot and further including:

clamp means on said main support and engaging said pedestal upper section and providing for the pole housing to be raised of lowered with respect to the pedestal and clamped in position wherein the bottom of the pole housing is substantially spaced from the floor.

4. A service pole for supplying power and/or telephone outlets in a room, the pole being adapted to extend between the floor and the ceiling of the room and the ceiling being the suspended type having means for supporting ceiling panels, the pole comprising:

a first elongated channel for carrying power conductors, the channel having a base and two sides and the top of each side being off-set to form an interior groove and an exterior groove;

a first cover extending across the open space formed by the sides of the first channel, the opposite sides of the cover having contoured flanges fitting into said exterior grooves whereby the cover is removably connected to the sides and said open space providing access to the interior of the channel when the cover is removed;

a second elongated channel for carrying telephone conductors the channel having a base and two sides, the top of each side being off-set to form an interior groove and an exterior groove and the base of the second channel being fixedly connected with the base of the first channel whereby to form a main support;

a second cover extending across the open space formed by the sides of the second channel, the opposite sides of the second cover having contoured flanges fitting into the exterior grooves of the sides of the second channel whereby the cover is removably connected to the sides, the open space providing access to the interior of the second channel when the second cover is removed and said channels and covers forming a pole housing;

a junction box disposed at the top of said pole housing in communication with said first channel, the junction box having a portion substantially off-set from the pole housing and carrying a removable cover facing in a downward direction;

pedestal means disposed at the bottom of said pole housing for supporting the pole on a floor and said second cover and said pedestal means being constructed and arranged to permit the second cover to be removed and provide access to the second channel without interference from the pedestal means;

said first cover having a plurality of receptacle openings;

a plurality of receptacle retainers each having an opening respectively aligned with said first cover openings and opposite edges of the retainer disposed in the interior grooves of the sides of said first channel and the flanges of said first cover bearing on said exterior grooves and pushing the interior grooves against the retainer to fix the retainer in position; and power outlet assembly means including a pair of conductors and a plurality of substantially identical receptacles connected to the conductors, each receptacle having a raised section and the raised sections respectively extending through said aligned openings and each said retainer bearing on its receptacle and causing the same to firmly engage said main support.

5. The pole of claim 4 further including a retainer identical to first said retainers, the opposite edges of which are disposed in the interior grooves at the bottom of the second channel and the flanges of the second cover bearing on said exterior grooves and pushing the interior grooves against the retainer edges to fix the retainer in position and the retainer being for use in guarding against the cover being dislodged by a radial pull exerted on a telephone cable extending out of the second channel.

6. A service pole for supplying power and/or telephone outlets in a room, the pole being adapted to extend between the floor and the ceiling of the room and the ceiling being the suspended type having means for supporting ceiling panels, the pole comprising:

a first elongated channel for carrying power conductors, the channel having a base and two sides and the top of each side being off-set to form an interior groove and an exterior groove;

a first cover extending across the open space formed by the sides of the first channel, the opposite sides of the cover having contoured flanges fitting into said exterior grooves whereby the cover is removably connected to the sides and said open space providing access to the interior of the channel when the cover is removed;

a second elongated channel for carrying telephone conductors the channel having a base and two sides, the top of each side being off-set to form an interior groove and an exterior groove and the base of the second channel being fixedly connected with the base of the first channel whereby to form a main support;

a second cover extending across the open space formed by the sides of the second channel, the opposite sides of the second cover having contoured flanges fitting into the exterior grooves of the sides of the second channel whereby the cover is removably connected to the sides, the open space providing access to the interior of the second channel when the second cover is removed and said channels and covers forming a pole housing;

a junction box disposed at the top of said pole housing in communication with said first channel, the junction box having a portion substantially off-set from the pole housing and carrying a removably cover facing in a downward direction;

pedestal means disposed at the bottom of said pole housing for supporting the pole on a floor and said second cover and said pedestal means being consturcted and arranged to permit the second cover to be removed and provide access to the second channel without interference from the pedestal means;

said main support having a vertically extending slot formed at the bottom thereof and said pedestal means comprises a foot having a lower section for engaging the floor and an upper section extending into said slot;

clamp means on opposite sides of said main support and engaging said pedestal upper section and providing for the pole housing to be raised or lowered with respect to the pedestal and clamped in position wherein the bottom of the pole housing is substantially spaced from the floor; and said pedestal upper section being generally in the form of a rod and having a pair of axially extending flats, and said clamp means including a pair of plates respectfully disposed on opposite sides of said support and each plate having a flat section engaging a flat section of the pedestal and fastener means holding the plates on said main support section and causing the flats on plates to tightly bear on the pedestal flats.

* * * * *